June 20, 1933.　　　　J. PASHLEY　　　　1,914,615

COTTON OPENING MACHINE

Filed Dec. 9, 1930

Patented June 20, 1933

1,914,615

UNITED STATES PATENT OFFICE

JOHN PASHLEY, OF STALYBRIDGE, ENGLAND, ASSIGNOR TO TAYLOR, LANG & COMPANY, LIMITED, OF STALYBRIDGE, ENGLAND, A BRITISH COMPANY

COTTON OPENING MACHINE

Application filed December 9, 1930, Serial No. 501,087, and in Great Britain January 29, 1930.

This invention relates to cotton opening machines of the porcupine type, and has for its object to provide improved means for facilitating the extraction of dust, short fibre and the like from the cotton under treatment.

My invention comprises a cotton opening machine of the aforesaid type including a beater casing, a revolving cylinder in said casing, beater arms radiating from said cylinder, cotton feeding means delivering cotton into the path of said beater arms, grid bars in said casing around the beater cylinder, a revolving perforated cage between said grid bars and the cotton feeding means a section of which cage projects into said beater casing through a gap or throat therein adjacent to the said feeding means at the side to which cotton is thrown by the beater arms when they strike the cotton issuing from the feeding means, and means applying suction to said revolving cage to extract dust from the cotton passing over the projecting section of said revolving cage, the beaters stripping the cotton from the cage and carrying it over the grid bars to the machine outlet.

Referring to the accompanying explanatory drawing:—

The same reference letters in the two views indicate the same or similar parts.

Figure 1:
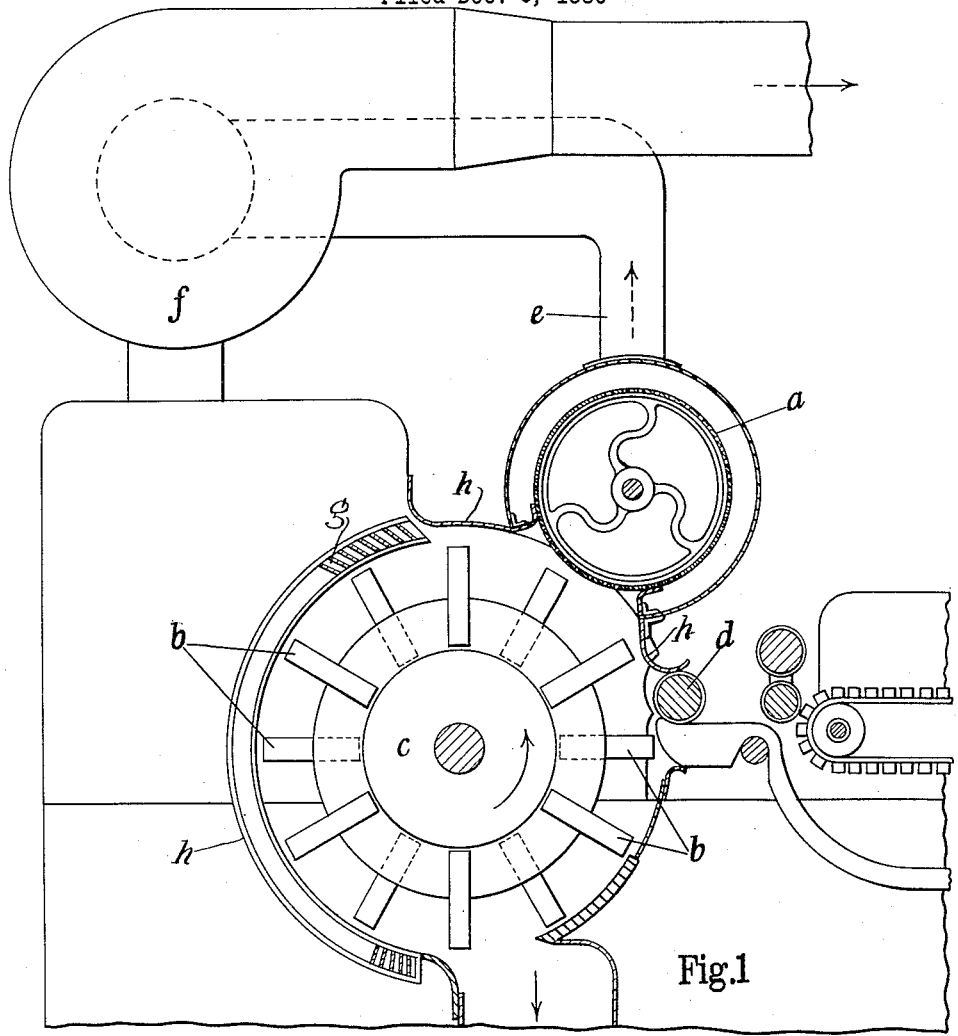
Figure 1 is a sectional view showing a porcupine opener of the upstroke type having my invention applied thereto.

In the machine shown in Figure 1, I provide a revolving cage $a$ in a position where it receives upon its surface the cotton which is thrown upwards by the beater arms $b$ upon the cylinder $c$ as they pass the feed roller $d$. The extraction of air through the cage $a$ by the exhaustion duct $e$ and fan $f$, in conjunction with the combing action of the beaters, causes dust and short fibre in the material as it passes over the surface of the cage to be drawn into the latter, whilst the cotton falls by gravity off the cage into the path of the beaters or is stripped from the cage by the beaters by which it is carried forward in the usual manner. After passing the cage $a$, the cotton passes over the usual grid bars $g$ by which seeds and the like are extracted from the cotton. As shown in the drawing the revolving cage $a$ projects into the beater casing $h$ through a gap or throat in the latter.

The cage which may have a perforated or wire mesh surface may have exhaustion applied to its surface as shown, or may be in communication in a known manner at one or both ends with a fan or exhauster by which the dust and short fibre are extracted.

Figure 2:
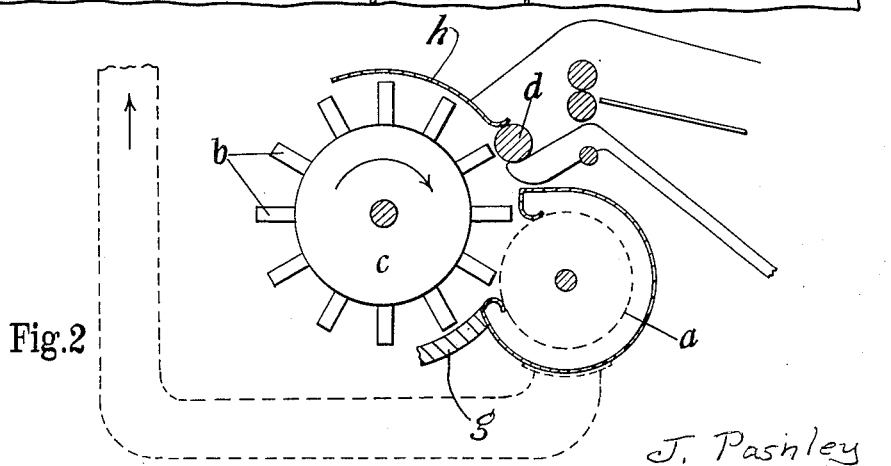
Figure 2 is a similar view, but drawn to a smaller scale of a downstroke type of machine.

Figure 2 shows my invention applied to a downstroke type of porcupine opener. The action is however similar in principle to that before described.

I may, if desired, strip the cotton from the cage mechanically, as by means of a revolving roller or wiper.

What I claim is:—

1. In cotton opening machines of the porcupine type, in combination, a beater casing, a revolving cylinder in said casing, beater arms radiating from said cylinder, cotton feeding means delivering cotton into the path of said beater arms, grid bars in said casing around the beater cylinder, a revolving perforated cage between said grid bars and the cotton feeding means a section of which cage projects into said beater casing through a gap or throat therein adjacent to said feeding means at the side to which cotton is thrown by the beater arms when they strike the cotton issuing from the feeding means, and means applying suction to said revolving cage to extract dust from the cotton passing over the projecting section of said revolving cage, the beaters stripping the cotton from the cage and carrying it over the grid bars to the machine outlet.

2. In cotton opening machines of the porcupine type, in combination, a beater casing, a revolving cylinder in said casing, beater arms radiating from said cylinder, cotton feeding means delivering cotton into the path of said beater arms, grid bars in said casing around the beater cylinder, a revolving perforated cage immediately above the cotton feeding means a section of which cage projects into said beater casing through a gap or throat therein between said feeding means and the grid bars, and means applying suction to said revolving cage to extract dust from the cotton passing over the projecting section of said revolving cage, the beaters stripping the cotton from the cage and carrying it over to the grid bars to the machine outlet.

In testimony whereof I have signed my name to this specification.

JOHN PASHLEY.